(12) United States Patent
Kashiwagi et al.

(10) Patent No.: US 10,137,664 B2
(45) Date of Patent: Nov. 27, 2018

(54) COMPOSITE MATERIAL STRUCTURE, AIRCRAFT WING AND AIRCRAFT FUSELAGE PROVIDED WITH SAME, AND METHOD FOR MANUFACTURING COMPOSITE MATERIAL STRUCTURE

(71) Applicant: MITSUBISHI HEAVY INDUSTRIES, LTD., Tokyo (JP)

(72) Inventors: Masahiro Kashiwagi, Tokyo (JP); Yoshinori Nonaka, Tokyo (JP); Toshio Abe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 155 days.

(21) Appl. No.: 15/117,895

(22) PCT Filed: Mar. 17, 2015

(86) PCT No.: PCT/JP2015/057786
§ 371 (c)(1),
(2) Date: Aug. 10, 2016

(87) PCT Pub. No.: WO2015/146690
PCT Pub. Date: Oct. 1, 2015

(65) Prior Publication Data
US 2017/0008250 A1    Jan. 12, 2017

(30) Foreign Application Priority Data

Mar. 28, 2014 (JP) .................. 2014-067920

(51) Int. Cl.
*B32B 3/24*     (2006.01)
*B32B 5/12*     (2006.01)
(Continued)

(52) U.S. Cl.
CPC ............... *B32B 5/12* (2013.01); *B29C 53/02* (2013.01); *B29C 70/202* (2013.01);
(Continued)

(58) Field of Classification Search
None
See application file for complete search history.

(56) References Cited

U.S. PATENT DOCUMENTS 4,954,387 A     9/1990   Sikorski
5,452,867 A *   9/1995   Grunwald ................ B64C 3/24
                                                       156/173
(Continued)

FOREIGN PATENT DOCUMENTS

CN    101657352    2/2010
CN    103201167    7/2013
(Continued)

OTHER PUBLICATIONS

The First Office Action dated May 2, 2017 in corresponding Chinese Application No. 201580009194.4 (with English translation).
(Continued)

*Primary Examiner* — Jeffrey A Vonch
(74) *Attorney, Agent, or Firm* — Wenderoth, Lind & Ponack, L.L.P.

(57) ABSTRACT

In a composite material structure, which is configured as a fiber-reinforced plastic composite material extending in one direction and having a plurality of holes defined at intervals in a row in the one direction and which is subjected to a tensile load and/or a compressive load in the one direction, a peripheral region around the holes comprises a first area obtained by bending composite material, which is reinforced using continuous fibers that have been made even in a longitudinal direction, so that a center line of a width of the composite material weaves between adjacent holes and
(Continued)

zigzags in the one direction. A tensile rigidity and/or a compressive rigidity in the one direction of the peripheral region around the holes is lower than a tensile rigidity and/or a compressive rigidity in the one direction of other regions that surround the peripheral region.

16 Claims, 6 Drawing Sheets

(51) Int. Cl.
| | |
|---|---|
| B32B 5/26 | (2006.01) |
| B32B 5/28 | (2006.01) |
| B32B 7/00 | (2006.01) |
| B64C 1/14 | (2006.01) |
| B64C 1/12 | (2006.01) |
| B64C 3/20 | (2006.01) |
| B64C 3/26 | (2006.01) |
| B29C 53/02 | (2006.01) |
| B29C 70/20 | (2006.01) |
| B29C 70/22 | (2006.01) |
| B29C 70/30 | (2006.01) |
| B32B 3/26 | (2006.01) |
| B32B 5/14 | (2006.01) |
| B64C 1/06 | (2006.01) |
| B29K 105/10 | (2006.01) |
| B64C 1/00 | (2006.01) |
| B29K 105/08 | (2006.01) |
| B29K 307/04 | (2006.01) |
| B29L 31/30 | (2006.01) |
| B32B 5/06 | (2006.01) |
| B29L 31/00 | (2006.01) |
| B64C 3/18 | (2006.01) |
| B64C 3/34 | (2006.01) |

(52) U.S. Cl.
CPC .......... *B29C 70/228* (2013.01); *B29C 70/30* (2013.01); *B32B 3/266* (2013.01); *B32B 5/14* (2013.01); *B32B 5/142* (2013.01); *B32B 7/005* (2013.01); *B64C 1/068* (2013.01); *B64C 1/12* (2013.01); *B64C 1/14* (2013.01); *B64C 3/20* (2013.01); *B29K 2105/08* (2013.01); *B29K 2105/101* (2013.01); *B29K 2105/105* (2013.01); *B29K 2105/108* (2013.01); *B29K 2307/04* (2013.01); *B29L 2031/3082* (2013.01); *B29L 2031/3085* (2013.01); *B29L 2031/737* (2013.01); *B32B 5/06* (2013.01); *B32B 5/26* (2013.01); *B32B 5/28* (2013.01); *B32B 2250/20* (2013.01); *B32B 2260/021* (2013.01); *B32B 2260/023* (2013.01); *B32B 2260/046* (2013.01); *B32B 2305/07* (2013.01); *B32B 2305/10* (2013.01); *B32B 2305/20* (2013.01); *B32B 2307/50* (2013.01); *B32B 2307/54* (2013.01); *B32B 2313/04* (2013.01); *B32B 2605/18* (2013.01); *B64C 1/06* (2013.01); *B64C 1/1492* (2013.01); *B64C 3/18* (2013.01); *B64C 3/26* (2013.01); *B64C 3/34* (2013.01); *B64C 2001/0072* (2013.01); *Y02T 50/43* (2013.01); *Y10T 428/16* (2015.01); *Y10T 428/162* (2015.01); *Y10T 428/164* (2015.01); *Y10T 428/24083* (2015.01); *Y10T 428/24099* (2015.01); *Y10T 428/24116* (2015.01); *Y10T 428/24124* (2015.01); *Y10T 428/24132* (2015.01); *Y10T 428/24322* (2015.01); *Y10T 428/24942* (2015.01)

(56) References Cited

U.S. PATENT DOCUMENTS

| | | | | |
|---|---|---|---|---|
| 5,771,680 | A * | 6/1998 | Zahedi | B32B 15/14 60/226.1 |
| 8,424,804 | B2 * | 4/2013 | Klaukien | B64C 1/064 244/119 |
| 2002/0028332 | A1 * | 3/2002 | Pratt | A01K 87/00 428/364 |
| 2004/0048022 | A1 * | 3/2004 | Pratt | A63C 5/12 428/36.91 |
| 2004/0161585 | A1 * | 8/2004 | Gaitonde | B64C 1/1446 428/131 |
| 2010/0133381 | A1 | 6/2010 | Klaukien et al. | |
| 2010/0320320 | A1 | 12/2010 | Kismarton | |
| 2011/0024562 | A1 * | 2/2011 | Kastner | B29C 70/30 244/119 |
| 2012/0121854 | A1 * | 5/2012 | Yoshida | B64C 1/061 428/137 |
| 2012/0223187 | A1 | 9/2012 | Kismarton | |
| 2013/0243992 | A1 | 9/2013 | Tanaka et al. | |
| 2014/0076477 | A1 | 3/2014 | Kismarton | |
| 2014/0377500 | A1 * | 12/2014 | Kashiwagi | B64C 3/20 428/131 |

FOREIGN PATENT DOCUMENTS

| | | | | |
|---|---|---|---|---|
| DE | 29813901 | U1 * | 2/1999 | ....... B29C 45/14786 |
| DE | 102012221404 | A1 * | 6/2014 | ............ B62D 7/20 |
| EP | 0313155 | A1 * | 4/1989 | .......... B29C 31/085 |
| EP | 1308265 | A1 * | 5/2003 | .......... B29C 70/202 |
| JP | 59089842 | A * | 5/1984 | ............. F16F 1/368 |
| JP | 1-263030 | | 10/1989 | |
| JP | 4-62038 | | 2/1992 | |
| JP | 4-89326 | | 8/1992 | |
| JP | 4-334696 | | 11/1992 | |
| JP | 2009-286817 | | 12/2009 | |
| JP | 2010-524769 | | 7/2010 | |
| JP | 2011-84008 | | 4/2011 | |
| JP | 2012-162147 | | 8/2012 | |
| JP | 2013-180627 | | 9/2013 | |
| WO | WO-9308023 | A1 * | 4/1993 | ............... B32B 3/18 |
| WO | 2012/105691 | | 8/2012 | |

OTHER PUBLICATIONS

Extended European Search Report dated Jun. 22, 2017 in corresponding European Application No. 15770101.2.
International Search Report dated Jun. 2, 2015 in International (PCT) Application No. PCT/JP2015/057786.
Written Opinion of the International Searching Authority dated Jun. 2, 2015 in International (PCT) Application No. PCT/JP2015/057786.

* cited by examiner

COMPOSITE MATERIAL STRUCTURE, AIRCRAFT WING AND AIRCRAFT FUSELAGE PROVIDED WITH SAME, AND METHOD FOR MANUFACTURING COMPOSITE MATERIAL STRUCTURE

TECHNICAL FIELD

The present invention relates to a composite material structure, an aircraft wing and aircraft fuselage provided with the same, and a method for manufacturing a composite material structure. The present invention particularly relates to a composite material structure having a plurality of holes formed in a row in one direction.

BACKGROUND ART

Composite materials made using fiber-reinforced plastics (FRP) are widely being used in aircraft, ships, vehicles, and the like as high-strength and lightweight structures (Japanese Unexamined Patent Application Publication No. 2013-180627A (Claim 1, Claim 3); hereinafter "JP 2013-180627A"). Composite materials have an advantage over metals in that composite materials are lighter and stronger.

SUMMARY OF INVENTION

Technical Problem

Holes are sometimes formed in such a composite material for access during inspections or assembly. In the case where holes are formed, stress concentrates in peripheral regions around the holes. A metal will not break immediately even if an area where stress concentrates reaches a yield stress; rather, the metal will undergo plastic deformation before eventually breaking. In typical designs, the static strength of a flat plate having holes, for example, is evaluated at a net stress obtained by dividing a load by a cross-sectional area excluding the holes. Compared to metal, a composite material experiences little plastic deformation and is thus more sensitive to concentrations in stress (at holes and cutouts), and this makes it necessary to consider concentrations in stress when evaluating the static strength as well. As a result, reinforcements are made by increasing the thickness of the plate around the holes, which can cancel out the advantage of being "lighter and stronger".

To solve the above-described problem, in JP 2013-180627A, a tensile rigidity and/or compressive rigidity in one direction in the peripheral region of the hole is lower than a tensile rigidity and/or compressive rigidity in the one direction in another region surrounding the peripheral region. This alleviates concentrations of stress in the peripheral region of a hole in order to reduce reinforcements. In JP 2013-180627A, a fiber orientation is set to 0° in the other region, and the fiber orientation is set to 45° or −45° in the peripheral region of the hole.

In JP 2013-180627A, in the case where two composite materials in which the other region and the peripheral region are adjacent but the fiber orientations are different (between the peripheral region and the other region) are butted together, the fibers will not be continuous at the border of the part where the materials are butted together (an adjacent part). A resin that serves as a base material will therefore transmit loads, which can cause a drop in the strength of the composite material structure.

In a wing of an aircraft or the like disclosed in JP 2013-180627A, a main load acts in the direction in which the holes are arranged, and a shearing load may also act at the same time. According to JP 2013-180627A, the other region in which the fiber orientation is different from that in the peripheral region is adjacent to the peripheral region on both sides thereof, which can cause a drop in strength in a direction orthogonal to the direction of the main load. The risk of the strength dropping increases when the fibers are not continuous and a border where the fiber orientation changes is present upon an extension line of a diameter of the holes that is orthogonal to the main load direction.

SUMMARY OF INVENTION

Having been achieved in light of such circumstances, an object of the present invention is to provide a lightweight composite material structure while suppressing a drop in strength.

Solution to Problem

To solve the above-described problems, the present invention provides a composite material structure, configured as a fiber-reinforced plastic composite material extending in one direction and having a plurality of holes formed at intervals in a row in the one direction, that is subjected to a tensile load and/or a compressive load in the one direction, wherein a peripheral region around the holes includes a first area obtained by bending a composite material reinforced using continuous fibers made even in a longitudinal direction so that a center line of a width W of the composite material weaves between adjacent holes and zigzags in the one direction, and a tensile rigidity and/or a compressive rigidity in the one direction of the peripheral region is lower than a tensile rigidity and/or a compressive rigidity in the one direction of another region that surrounds the peripheral region.

The tensile rigidity in the one direction in the peripheral region around the holes is lower than the tensile rigidity in the one direction in the other region that surrounds the peripheral region around the holes, and thus a tensile load is primarily borne by the other region. Accordingly, the tensile load acting on the peripheral region of the holes becomes relatively low, alleviating concentrations of stress acting on the peripheral region around the holes. This makes it possible to reduce reinforcements in the peripheral region around the holes as compared to a case where the peripheral region around the holes is set to the same tensile rigidity as that of the other region.

In the case where the compressive rigidity in the one direction in the peripheral region around the holes is lower than the compressive rigidity in the one direction in the other region that surrounds the peripheral region around the holes, a compressive load is primarily borne by the other region. Accordingly, the compressive load acting on the peripheral region of the holes becomes relatively low, alleviating concentrations of stress acting on the peripheral region around the holes. This makes it possible to reduce reinforcements in the peripheral region around the holes as compared to a case where the peripheral region around the holes is set to the same compressive rigidity as that of the other region.

In the case where a tensile load and a compressive load act on the composite material structure (in other words, in the case where a bending load acts thereon), the tensile rigidity and the compressive rigidity in the one direction in the peripheral region around the holes may be made lower than the tensile rigidity and the compressive rigidity in the one direction in the other region so that the tensile load and the compressive load are borne primarily by the other region.

The peripheral region includes the first area constituted of a composite material reinforced using continuous fibers made even in the longitudinal direction (a composite material A). By causing the composite material A to bend, the fibers therein can be oriented in different directions. The strength and rigidity of the composite material structure can be changed by varying the orientation of the fibers. The tensile rigidity and the compressive rigidity in the one direction in a region where the composite material A is disposed so that the fibers are slanted relative to the one direction are lower than the tensile rigidity and the compressive rigidity in the one direction in the other region. Meanwhile, in the case where the composite material A has been disposed so that the fibers are oriented in the one direction, the fiber orientation is matched to that in the other region, making it possible to eliminate the risk of a drop in strength at a border between the peripheral region and the other region.

The fibers hold their continuous state even when the composite material A is bent. By making the fibers continuous, the strength in the one direction can be improved as compared to a case where short fibers are used. According to the present invention, the fibers are continuous, and thus there is no worry of gaps arising in the fibers at borders in the first area where the fiber orientation changes. This results in a composite material structure that is more precise than in the past.

Making the composite material A zigzag so as to weave between the holes makes it possible to dispose a single piece of the composite material A for a plurality of holes, and thus the composite material structure can be manufactured efficiently. The composite material A can also be disposed using a machine.

According to an aspect of the above-described invention, it is preferable that the first area include a slanted part in which, when the one direction is taken as 0°, the continuous fibers are oriented in a direction greater than or equal to ±30° and less than or equal to ±60°, and preferably ±45°; and that the slanted part be disposed between adjacent holes.

Disposing the slanted part between the holes makes it possible to realize a region in which the tensile rigidity in the 0° direction (the one direction) is reduced and extension in a tensile direction (and/or a compression direction) is permitted. In the slanted part, the fibers are oriented in a direction greater than or equal to ±30° and less than or equal to ±60°, and preferably ±45°, which increases the strength in the shear direction (a direction orthogonal to the one direction, or in other words, the ±90° direction) and makes it possible to increase the torsional rigidity.

According to an aspect of the above-described invention, it is preferable that the first area include a parallel part in which the continuous fibers are oriented in the 0° direction; and that the parallel part be disposed at least in a location of the first area including an extension line of a diameter of the hole that is oriented in a ±90° direction, and make contact with the holes.

Providing the parallel part on the extension line of the diameter of the holes oriented in the ±90° direction so as to make contact with the holes makes it possible to alleviate concentrations of stress on the peripheral region of the holes without causing a drop in strength at locations that break easily. This results in a composite material structure having a high substantial strength.

According to an aspect of the above-described invention, it is preferable that the parallel part be disposed in a location including an outer edge of the first area in a region parallel to a diameter of the hole in the 0° direction.

The outer edge of the first area in a region parallel to the diameter of the holes in the 0° direction is, in other words, the peripheral region at the border with the other region. The composite material A zigzags so that the center line of the width W of the composite material A weaves between the holes. When the diameter of the holes in the 0° direction is taken as an axis, the composite material A on one side of a given hole is located on the other side of the next hole. By disposing the parallel part at the border with the other region, the orientation of the fibers in the peripheral region can be matched to the orientation of the fibers in the adjacent other region. This makes it possible to suppress a drop in strength in the ±90° direction at a part where the peripheral region and the other region connect.

According to an aspect of the above-described invention, in the case where an orientation of continuous fibers in one slanted part is orthogonal to an orientation of continuous fibers in the next slanted part, a width W can be defined as less than or equal to $1/\sqrt{2}$ a distance L between centers of adjacent holes.

The composite material A zigzags between the holes, and thus the fibers in one slanted part are oriented in a different direction from the fibers in the next slanted part. In the case where the direction of the fibers in the one slanted part is at a right angle relative to the direction of the fibers in the next slanted part, setting the width W of the composite material A to be less than or equal to $1/\sqrt{2}$ a distance L between the centers of adjacent holes makes it possible to dispose the parallel part on the extension line of the diameter of the holes that is in the ±90° direction.

According to an aspect of the above-described invention, the parallel part may be a region parallel to the diameter of the holes that is in the 0° direction.

Through this, the entirety of the regions parallel to the holes serves as the parallel part, and thus the strength around the holes with respect to the 0° direction can be increased. Because there are no longer any borders where the direction of the fibers switch in the ±90° direction of the holes, the strength around the holes with respect to the ±90° direction can be increased.

According to an aspect of the above-described invention, it is preferable that a layer including a first area A in which a composite material reinforced using continuous fibers made even in the longitudinal direction repeatedly bends so as to form peak areas and valley areas in that order, and a layer including a first area B in which a composite material reinforced using continuous fibers made even in the longitudinal direction repeatedly bends so as to form valley areas and peak areas in that order, be laminated together so that the peak areas in the first area A and the corresponding valley areas in the first area B form vertical pairs.

In the slanted part in the first area, the fibers are not continuous and the orientations of the fibers are different from other areas adjacent to the first area in the same layer. According to this aspect of the above-described invention, making vertical pairs of the peak areas in the first area A and the valley areas in the first area B makes it possible to stagger, in the vertical direction, the borders between the slanted part and the areas adjacent thereto. This makes it possible to alleviate the risk of a drop in strength in the ±90° direction.

According to an aspect of the above-described invention, the holes can be access holes formed in a lower surface outer plate of an aircraft wing.

The lower surface outer plate constitutes a lower surface part of a torque box that bears a load acting on a main wing of an aircraft. As such, during flight, a tensile load acts on the lower surface outer plate in a longitudinal direction of the main wing. A predetermined region around the access holes is taken as the above-described peripheral region and a region that surrounds this peripheral region is taken as the above-described other region, and thus the other region primarily bears the tensile load and only a comparatively small tensile load acts on the peripheral region. Accordingly, reinforcements in the peripheral region of the access holes can be reduced, and thus a lightweight main wing can be provided.

According to an aspect of the above-described invention, the holes can be window holes formed in an outer plate of an aircraft fuselage.

A tensile load and a compressive load (in other words, a bending load) acts in a longitudinal direction on the fuselage of an aircraft. A predetermined region around the window holes is taken as the above-described peripheral region and a region that surrounds this peripheral region is taken as the above-described other region, and thus the other region primarily bears the tensile load and the compressive load, and only a comparatively small tensile load and compressive load act on the peripheral region. Accordingly, reinforcements in the peripheral region of the window holes can be reduced, and thus a lightweight aircraft fuselage can be provided.

The present invention provides a method of manufacturing a composite material structure, the composite material structure configured as a fiber-reinforced plastic composite material extending in one direction and having a plurality of holes formed at intervals in a row in the one direction, and that is subjected to a tensile load and/or a compressive load in the one direction, and the method including: bending a composite material reinforced using continuous fibers made even in a longitudinal direction so that a center line of a width W of the composite material weaves between adjacent holes and zigzags in the one direction. A tensile rigidity and/or a compressive rigidity in the one direction of a peripheral region around the holes is lower than a tensile rigidity and/or a compressive rigidity in the one direction of another region that surrounds the peripheral region.

According to an aspect of the above-described invention, it is preferable that the composite material reinforced using continuous fibers made even in the longitudinal direction be disposed so that in the case where the one direction is taken as 0°, the continuous fibers are oriented in a direction greater than or equal to ±30° and less than or equal to ±60°, preferably of ±45°, between adjacent holes.

According to an aspect of the above-described invention, it is preferable that the composite material reinforced using continuous fibers made even in the longitudinal direction be disposed so that the continuous fibers are oriented in the 0° direction in a location including an extension line of the diameter of the holes that is oriented in a ±90° direction.

According to an aspect of the above-described invention, it is preferable that the composite material reinforced using continuous fibers made even in the longitudinal direction be disposed so that the continuous fibers are oriented in the 0° direction at an outer edge in a region parallel to the diameter of the holes that is oriented in the 0° direction.

According to an aspect of the above-described invention, the composite material reinforced using continuous fibers made even in the longitudinal direction may be disposed so that the continuous fibers are oriented in the 0° direction in a region parallel to the diameter of the holes that is oriented in the 0° direction.

Advantageous Effects of Invention

According to the composite material structure, the aircraft wing and aircraft fuselage provided with the same, and the method for manufacturing a composite material structure of the present invention, a lightweight structure that eliminates a cause of a drop in strength can be realized by disposing in a zigzag shape a composite material reinforced using continuous fibers made even in the longitudinal direction.

BRIEF DESCRIPTION OF DRAWINGS

FIG. 1A is a plan view and FIG. 1B is a vertical cross-sectional view taken from A-A in FIG. 1A.

DESCRIPTION OF EMBODIMENTS

First Embodiment

An embodiment of the present invention will be described below, using FIGS. 1A to 3.

FIG. 1A illustrates a lower surface outer plate 3 of an aircraft main wing 1. The lower surface outer plate 3 is formed as a composite material structure from fiber-reinforced plastic (FRP). A dashed line in FIG. 1A indicates an outline of the main wing 1 including flaps, slats, and the like.

Figure 2:
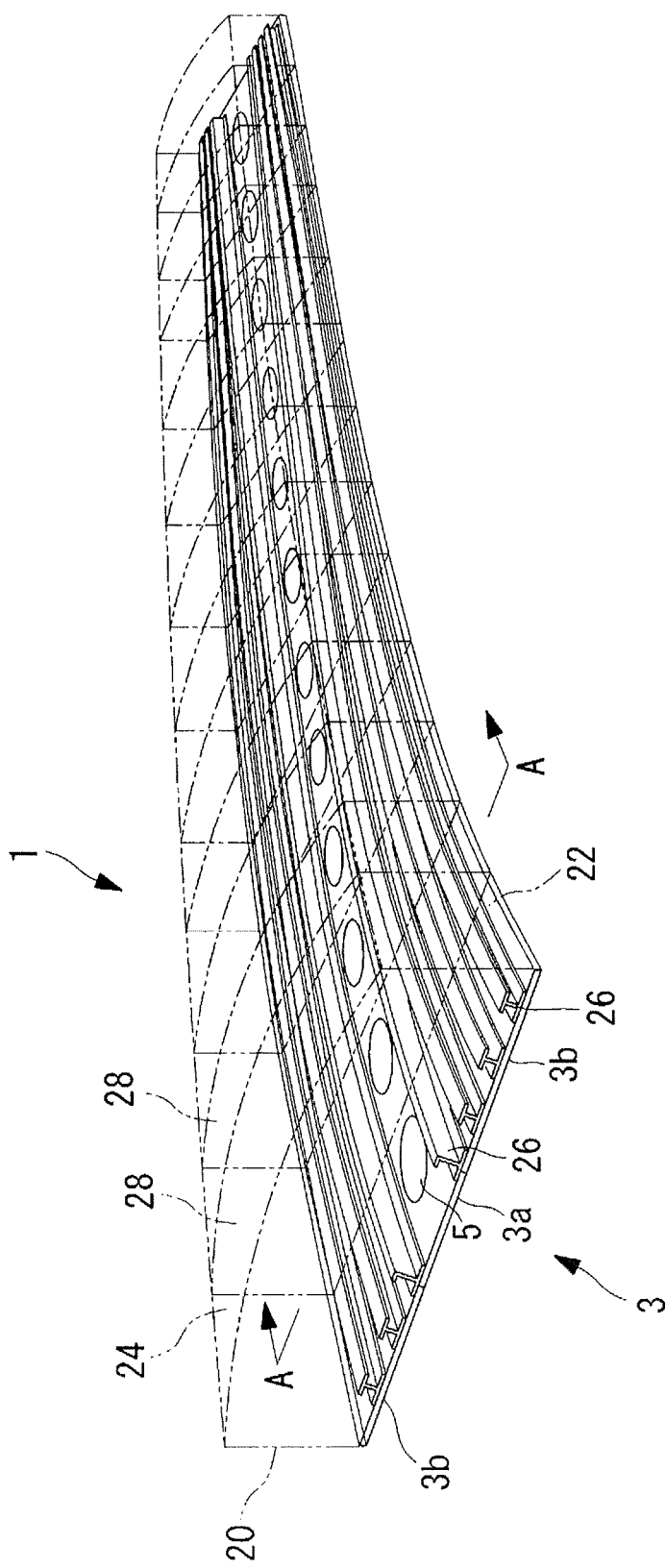
FIG. 2 is a perspective view of a lower surface outer plate and stringers that constitute part of a main wing having a box structure.
Figure 3:
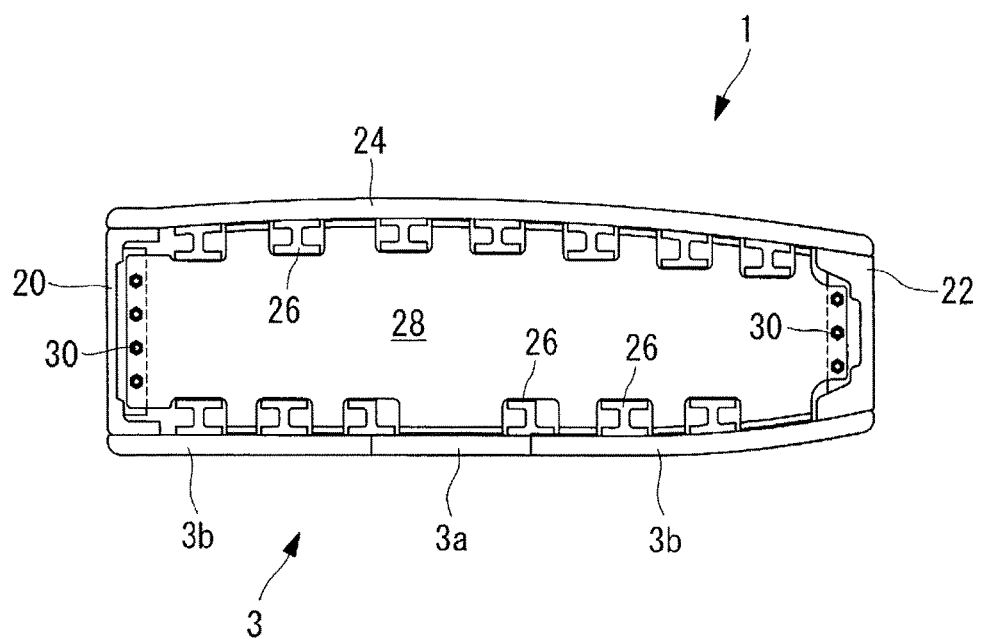
FIG. 3 is a horizontal cross-sectional view taken from A-A in FIG. 2.

As illustrated in FIGS. 2 and 3, the lower surface outer plate 3, a front spar 20 and a rear spar 22 serving as side surface outer plates erected from both ends of the lower surface outer plate 3 in a width direction thereof, and an upper surface outer plate 24 connecting upper ends of the front spar 20 and the rear spar 22 to each other form a box-shaped torque box, and bear a load of the main wing 1.

A plurality of stringers 26 are provided in a longitudinal direction of the main wing 1. The stringers 26 are formed from the same FRP composite material as the lower surface outer plate 3 and the like. Each stringer 26 is fixed to an inner surface of the lower surface outer plate 3 and the upper surface outer plate 24, and mainly bears a longitudinal direction load of the main wing 1.

Ribs 28 are provided inside the main wing 1 having a box structure so as to divide that interior space into a plurality of segments in the longitudinal direction. The ribs 28 have plate shapes extending across a width direction of the main wing 1 (a direction orthogonal to the longitudinal direction), and a plurality of the ribs 28 are provided at predetermined intervals in the longitudinal direction. As illustrated in FIG. 3, front and rear ends of each rib 28 are fastened to the front spar 20 and the rear spar 22, respectively, by predetermined fasteners 30 such as bolts and nuts.

Figure 1:
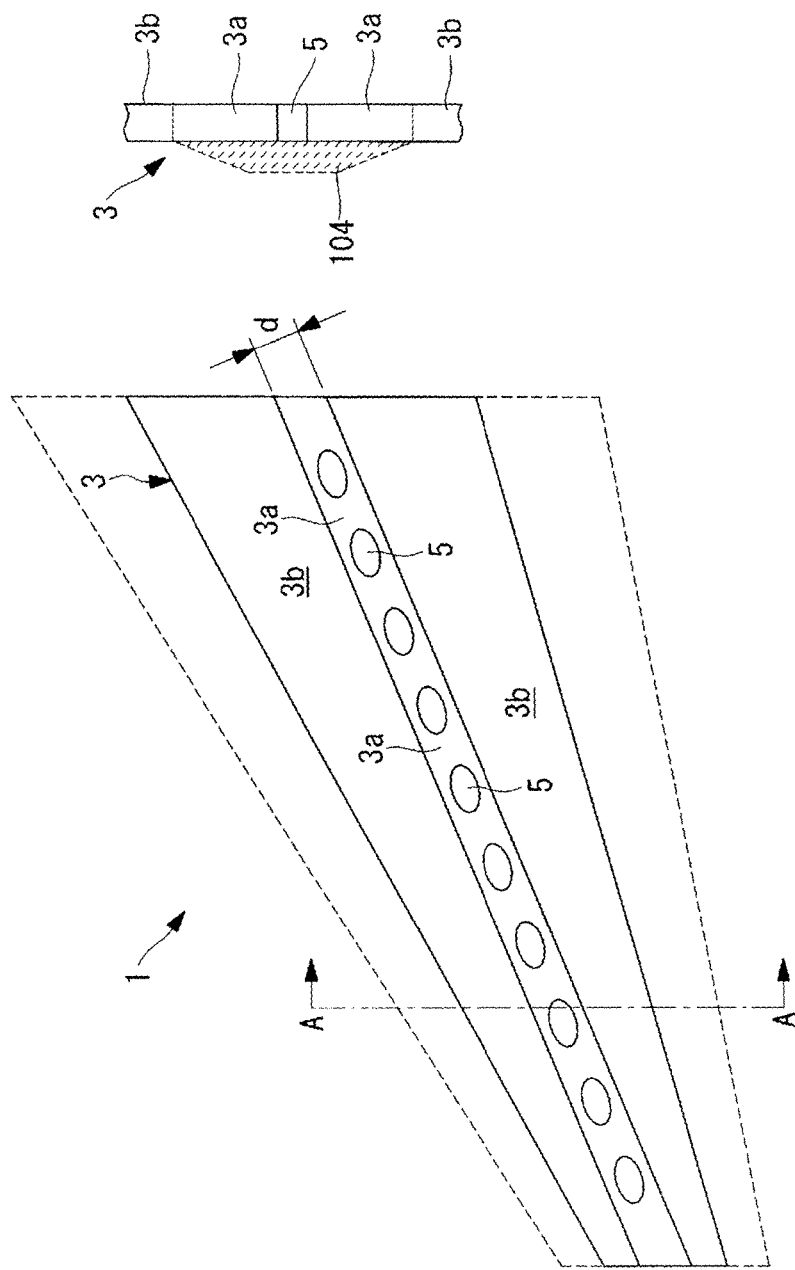
FIGS. 1A and 1B illustrate a lower surface outer plate of a main wing of an aircraft according to an embodiment of a composite material structure of the present invention, where

As illustrated in FIG. 1, a plurality of access holes (holes) 5 used during inspection, assembly, or the like of a fuel tank provided in the main wing 1 are formed in the lower surface outer plate 3 at predetermined intervals in an extension direction of the main wing 1.

The lower surface outer plate 3 is constituted of a peripheral region 3a located in the periphery of the access holes 5 and another region 3b that surrounds the peripheral region 3a, and is formed from a single piece of a composite material.

Taking a line that passes through the centers of the access holes 5 and follows the extension direction of the main wing 1 as an axis, the peripheral region 3a is provided spanning a predetermined width d on both sides of that axis. Here, the "width d" serves as a distance of the peripheral region in a direction orthogonal to the extension direction of the main wing 1.

The other region 3b is located in the periphery of the peripheral region 3a, and is present in a range corresponding to all regions aside from the peripheral region 3a.

The peripheral region 3a and the other region 3b that constitute the lower surface outer plate 3 are a composite material constituted mainly of carbon fiber-reinforced plastic (CFRP). The number of layers of the composite material is determined on the basis of the strength to be borne, and is set to approximately several tens of layers, for example.

Percentages of orientations of the carbon fibers in the other region 3b are set to approximately the normal percentages used in aircraft structures; in the case where the extension direction of the main wing 1 (the longitudinal direction) is taken as 0°, a plurality of fiber sheets having fiber directions of 0°, +45°, −45°, and 90° are laminated together so that the percentages of (0°, +45°, −45°, 90°)= (30%, 30%, 30%, 10%), for example.

Percentages of carbon fiber orientations in the peripheral region 3a are different from those in the other region 3b; in the case where the extension direction of the main wing 1 is taken as 0°, the orientation of the carbon fibers is primarily greater than or equal to ±30° and less than or equal to ±60°, and preferably ±45°, between adjacent holes 5. In other words, a plurality of fiber sheets having each of the fiber directions are laminated together so that the percentage of an orientation of greater than or equal to ±30° and less than or equal to ±60°, and preferably ±45°, is greater than in the other region 3b, such that the percentage of an orientation of ±45° is greater than or equal to 70%, for example. Furthermore, the fibers in the 0° direction may be switched from carbon fibers to glass fibers, aramid fibers, or the like in order to reduce tensile rigidity in the 0° direction.

Figure 4:
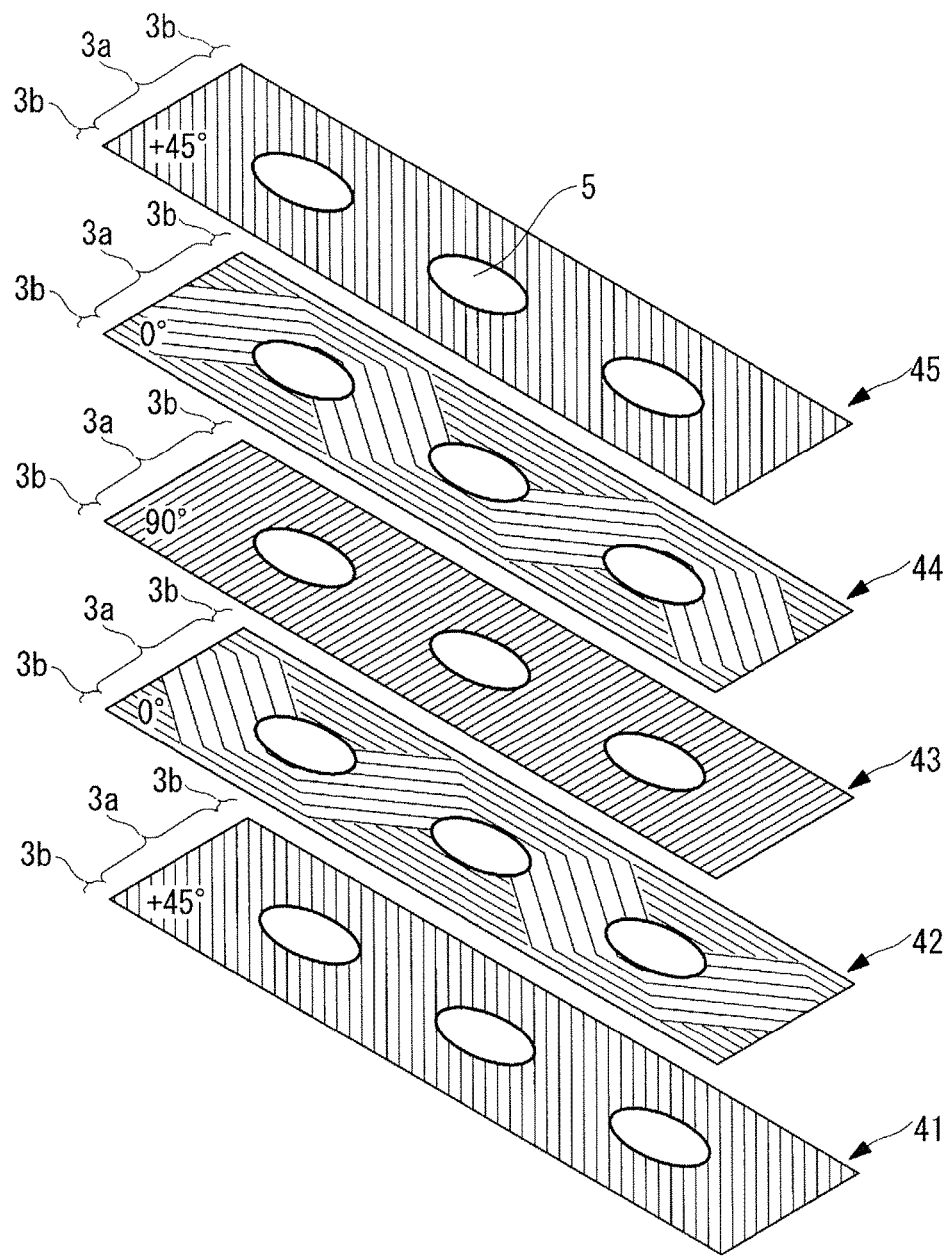
FIG. 4 is an exploded perspective view illustrating primary elements in a multilayer structure of fiber sheets.

The multilayer structure of the lower surface outer plate 3 having orientation percentages such as those described above will be described with reference to FIG. 4. FIG. 4 is an exploded perspective view illustrating an example of primary elements in the multilayer structure of fiber sheets. The multilayer structure illustrated in FIG. 4 is constituted of a first layer 41 to a fifth layer 45. The locations of the holes 5, the peripheral region 3a, and the other region 3b in the first layer 41 to the fifth layer 45 correspond with each other in a vertical direction. In FIG. 4, the direction in which the holes 5 are arranged (the extension direction of the main wing 1) is taken as 0°.

The first layer 41 is a layer in which the fibers are oriented in the +45° direction. The first layer 41 is formed with a +45° fiber sheet disposed throughout both the peripheral region 3a and the other region 3b.

The second layer 42 is a layer in which the fibers are mainly oriented in the 0° direction. The second layer 42 is formed by disposing a peripheral region composite material in the peripheral region 3a and an other region composite material in the other region 3b. The specific arrangement of the peripheral region composite material and the other region composite material will be described later.

The third layer 43 is a layer in which the fibers are oriented in the 90° direction. The third layer 43 is formed with a 90° fiber sheet disposed throughout both the peripheral region 3a and the other region 3b.

The fourth layer 44 is a layer in which the fibers are mainly oriented in the 0° direction. The fourth layer 44 is formed by disposing the peripheral region composite material in the peripheral region 3a and the other region composite material in the other region 3b.

The fifth layer 45 is, like the first layer 41, a layer in which the fibers are oriented in the +45° direction. The fifth layer 45 is formed with a +45° fiber sheet disposed throughout both the peripheral region 3a and the other region 3b.

Figure 5:
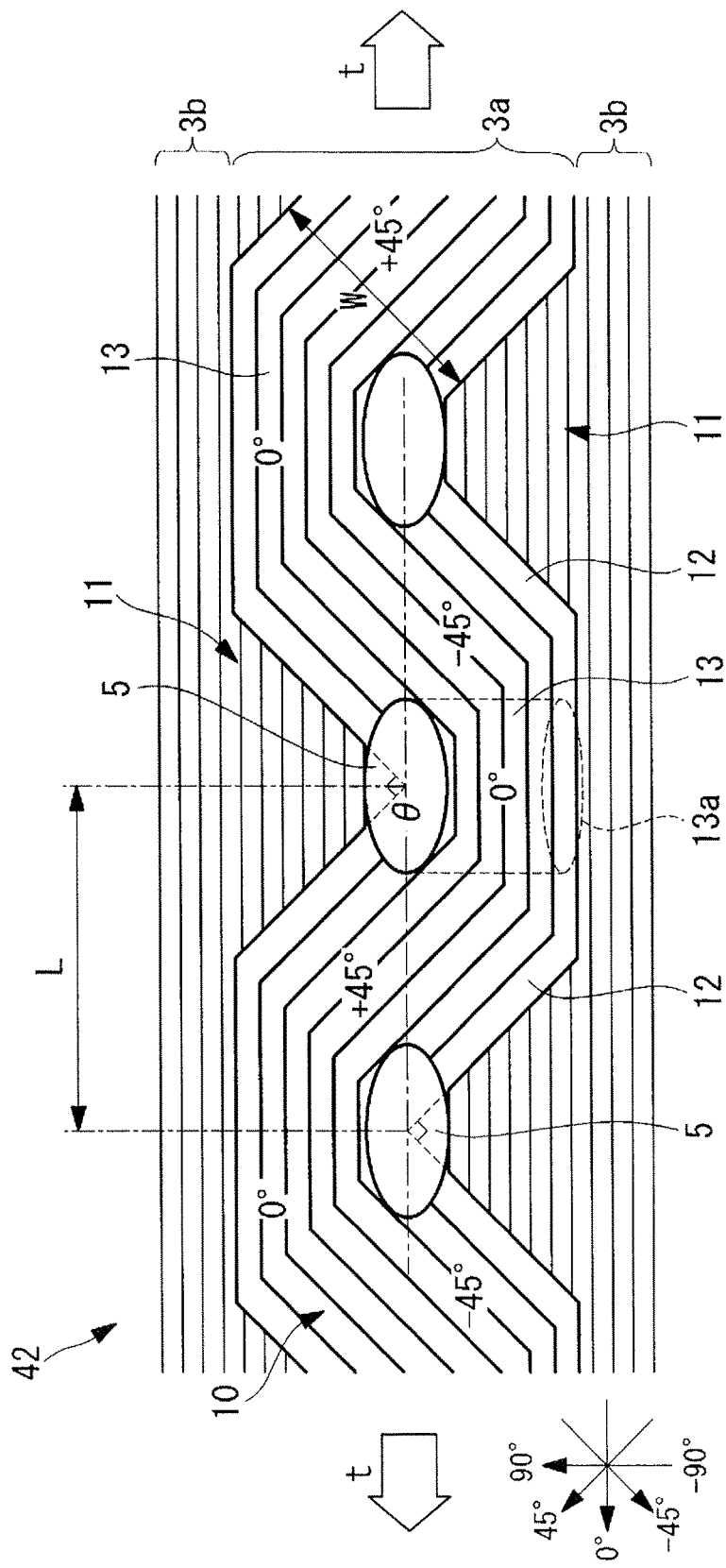
FIG. 5 is a plan view illustrating primary elements in a second layer according to a first embodiment.

The second layer 42 will be described in more detail with reference to FIG. 5. FIG. 5 is a plan view illustrating primary elements of the second layer 42. In FIG. 5, the second layer 42 is constituted of a plurality of the holes 5 formed at intervals along a direction t in which a main load is borne, the peripheral region 3a present around the holes 5, and the other region 3b present on both sides of the peripheral region 3a. The peripheral region 3a includes a first area 10 realized by disposing a first peripheral region composite material and a second area 11 realized by disposing a second peripheral region composite material. The first peripheral region composite material and the second peripheral region composite material are composite materials reinforced using continuous fibers made even in the longitudinal direction (a composite material A). Here, "continuous fibers" refers to a state in which the peripheral region 3a is not cut in the t direction. The composite material A is a sheet-form prepreg, a partially impregnated prepreg, or the like.

The first area 10 is realized by disposing the composite material A in a bending zigzag shape so that a center line of a width W of the composite material A weaves between adjacent holes 5. It is preferable that the composite material A zigzag symmetrically using a line passing through the centers of the plurality of holes 5 as an axis. The composite material A may achieve the width W by aligning a plurality of thin prepregs.

It is preferable that the width W be set to a length at which the space between adjacent holes 5 is filled by the composite material A when the composite material A is arranged in the zigzag shape. The width W is a length of the composite material in a direction orthogonal to the orientation of the continuous fibers. The width W of the composite material A can be determined on the basis of a distance L between the centers of adjacent holes 5. For example, in the case where the orientation of the fibers in one slanted part is orthogonal to the orientation of the fibers in the next slanted part (θ=90°), as indicated in FIG. 5, it is preferable that the width W be set to less than or equal to $1/\sqrt{2}$ the distance L between the centers of adjacent holes 5.

The first area 10 includes slanted parts 12 and parallel parts 13. The slanted parts 12 and the parallel parts 13 are disposed alternately. In FIG. 5, the composite material A bends when changing from the slanted part 12 to the parallel part 13 so that the fiber orientation switches at a predetermined angle, but may instead bend so that the fiber orientation changes gradually so as to trace a curve.

The slanted parts 12 are located between adjacent holes 5, with the continuous fibers in the composite material A being oriented in a direction greater than or equal to ±30° and less than or equal to ±60°, and preferably ±45°.

The parallel parts 13 are disposed in positions including an extension line of the minor axis of the holes 5 (a diameter oriented in the ±90° direction). It is preferable that the parallel parts 13 also be disposed in locations including outer edges 13a of the first area 10 in regions parallel to the major axis of the holes 5 (the diameter of the holes 5 in the 0° direction). The parallel parts 13 are at least partially in contact with the holes 5.

The second area 11 is a valley area corresponding to a part where the zigzagging first area bends. The second area 11 is realized by disposing the second peripheral region composite material in the valley area so that the fiber orientation is in the 0° direction.

The fourth layer 44 has the same configuration as the second layer 42. However, it is preferable that the first area in the fourth layer 44 have a zigzag shape in which the peak and valley areas are inverted with respect to those in the first area of the second layer 42. Specifically, the first area 10 in the second layer 42 has a zigzag shape in which the composite material A repeatedly bends so as to form peak areas and valley areas in that order, whereas the first area in the fourth layer 44 has a zigzag shape in which the composite material A repeatedly bends so as to form valley areas and peak areas in that order. When the second layer 42 and the fourth layer 44 having such first areas are laminated together, the peak areas in the first area of the second layer 42 and the valley areas in the first area of the fourth layer 44 form vertical pairs.

By repeating the first layer 41 to the fifth layer 45 described above or combining those layers as desired (see FIG. 5), the peripheral region 3a can primarily have an orientation percentage of greater than or equal to ±30° and less than or equal to ±60°, and preferably ±45°, as compared to the other region 3b.

Effects obtained when using the main wing 1 configured as described above will be described next.

During flight, a load that causes a tip of the main wing 1 to deform upward acts on the main wing 1. Accordingly, a tensile load in the extension direction (0° direction) of the lower surface outer plate 3 of the main wing 1 acts on the lower surface outer plate 3. The tensile load in the 0° direction is primarily borne not by the peripheral region 3a, but rather by the other region 3b of the lower surface outer plate 3. This is because compared to the other region 3b, the peripheral region 3a is primarily formed from fibers oriented in a direction greater than or equal to ±30° and less than or equal to ±60°, and preferably ±45°, and is therefore a region having a low rigidity with respect to a tensile load in the 0° direction. Accordingly, compared to the other region 3b, only a small tensile load acts on the peripheral region 3a, and thus less strength is required for the peripheral region 3a. In other words, it is not necessary to provide a reinforcing laminated body for increased thickness around the holes. FIG. 1B indicates a reinforcing laminated body 104 as well to facilitate understanding. As such, the reinforcing laminated body 104 is unnecessary, and thus the weight can be reduced by that amount.

The peripheral region 3a is primarily formed from fibers oriented in a direction greater than or equal to ±30° and less than or equal to ±60°, and preferably ±45°, and is therefore strengthened with respect to rigidity in a shear direction, or in other words, torsional rigidity. Accordingly, the peripheral region 3a bears a torsional load, and does not bear an axial force (a tensile load).

The peripheral region 3a includes the first area 10 realized by causing the composite material A, which is reinforced using continuous fibers made even in the longitudinal direction, to zigzag. Because the composite material A contains the continuous fibers, the fibers hold their continuous state even when bent. By making the fibers continuous, the strength in the 0° direction can be increased as compared to a case where short fibers are used. By using a composite material reinforced using continuous fibers, there is no worry of gaps arising at borders in the first area where the fiber orientation changes. This results in a composite material structure that is more precise than in the past.

The first area 10 can be formed around the plurality of holes collectively by making the composite material A zigzag so as to weave between the holes 5, which makes it possible to dispose the composite material A using a machine and manufacture the composite material A efficiently.

Disposing the slanted parts 12 between the holes 5 makes it possible to realize a region in which the tensile rigidity in the 0° direction (one direction) is reduced and extension in a tensile direction (and/or a compression direction) is permitted. In the slanted parts 12, the fibers are oriented in a direction greater than or equal to ±30° and less than or equal to ±60°, and preferably ±45°, which increases the strength in the shear direction (a direction orthogonal to the one direction, or in other words, the ±90° direction) and makes it possible to increase the torsional rigidity.

Providing the parallel parts on the extension line of the diameter of the holes 5 oriented in the ±90° direction makes it possible to alleviate concentrations of stress on the peripheral region 3a of the holes 5 without causing a drop in strength at locations that break easily. This results in a composite material structure having a high substantial strength.

By disposing the parallel parts 13 in the peripheral region 3a serving as a border, the orientation of the fibers in the peripheral region 3a can be matched to the orientation of the fibers in the adjacent other region 3b. This makes it possible to suppress a drop in strength in the ±90° direction at the borders between the peripheral region 3a and the other region 3b.

When laminating the fiber sheets, making a pair of a peak area in a first area A of one layer and a valley area in a first area B of another layer makes it possible to stagger the borders of the fiber sheets in the vertical direction. This makes it possible to alleviate the risk of a drop in strength in the ±90° direction.

Second Embodiment

A composite material structure according to the present embodiment has the same configuration as that of the first embodiment aside from a range in which the parallel parts are provided.

Figure 6:
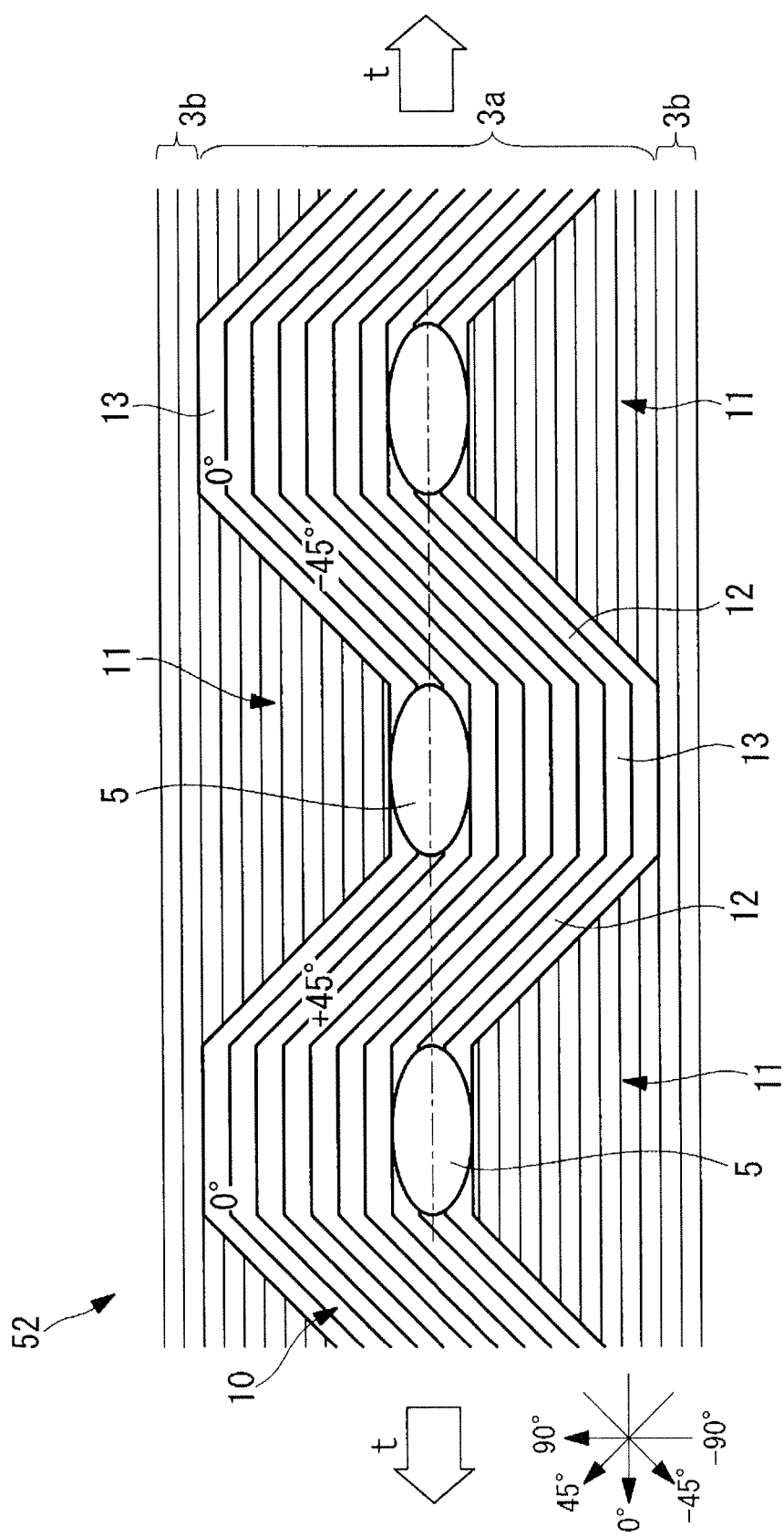
FIG. 6 is a plan view illustrating primary elements in a second layer according to a second embodiment.

FIG. 6 is a plan view illustrating primary elements of a second layer 52 according to the present embodiment. In the present embodiment, the parallel parts 13 are disposed throughout a region parallel to the major axis of the holes 5 (the diameter in the 0° direction). The length of the parallel parts is the same as that of the major axis of the holes 5.

By using the entirety of the regions parallel to the holes 5 as the parallel parts, the strength around the holes with respect to the 0° direction can be increased. Because there are no longer any borders where the direction of the fibers switch in the ±90° direction of the holes, the strength around the holes with respect to the ±90° direction can be increased.

Although the above embodiments described apply to the present invention in the lower surface outer plate 3 of the main wing 1, the present invention is not limited thereto, and can be broadly applied in any composite material structure having holes.

For example, the same configuration as that of the lower surface outer plate 3 may be applied in the upper surface outer plate that forms the torque box along with the lower surface outer plate 3. The present embodiment can also be applied in a tail assembly or the like.

The above embodiments can also be applied in an aircraft fuselage in which window holes are formed. Furthermore, the composite material structure according to the present invention is not limited to aircraft, and can also be applied in ships, vehicles, and the like, for example.

Although the above embodiments describe primarily using carbon fiber-reinforced plastic (CFRP), the present invention is not limited thereto, and glass fiber-reinforced plastic, aramid fiber-reinforced plastic, or the like may be used as well, for example.

REFERENCE SIGNS LIST

1 Main wing
3 Lower surface outer plate (composite material structure)
3*a* Peripheral region
3*b* Other region
5 Access hole (hole)
10 First area
11 Second area
12 Slanted part
13 Parallel part
13*a* Outer edge (of parallel part)
20 Front spar
22 Rear spar
24 Upper surface outer plate
26 Stringer
28 Rib
30 Fastener
41 First layer
42 Second layer
43 Third layer
44 Fourth layer
45 Fifth layer
104 Reinforcing laminated body

The invention claimed is:

1. A composite material structure, comprising a fiber-reinforced plastic composite material extending in one direction, wherein the one direction is 0°, and having a plurality of holes defined at intervals in a row in the one direction, that is subjected to a tensile load or a compressive load in the one direction, wherein:

a peripheral region around the holes includes a first area obtained by bending a composite material reinforced using continuous fibers made even in a longitudinal direction so that a center line of a width of the composite material weaves between adjacent holes and zigzags in the one direction;

a tensile rigidity and/or compressive rigidity in the one direction of the peripheral region is lower than a tensile rigidity and/or compressive rigidity in the one direction of another region that surrounds the peripheral region;

the first area includes at least two parallel parts, wherein a first parallel part is positioned on a side and in contact with a hole of the plurality and is connected to a second parallel part on a side and in contact with an adjacent hole of the plurality by a slanted part disposed between the hole and the adjacent hole, such that first parallel part on the side of the hole and the second parallel part on the side of the adjacent hole are on opposite sides; and wherein the parallel part comprises the continuous fibers oriented in a 0° direction, is parallel to a first diameter of its corresponding hole, and includes an extension line of a second diameter of its corresponding hole that is oriented in a ±90° direction, wherein a portion of the parallel part has a length equal to or greater than the first diameter of its corresponding hole.

2. The composite material structure according to claim 1, wherein the slanted part comprises the continuous fibers oriented in a direction greater than or equal to ±30° and less than or equal to ±60°.

3. The composite material structure according to claim 2, wherein the slanted part comprises the continuous fibers oriented in a direction of ±45°.

4. The composite material structure according to claim 1, wherein the portion of the parallel part equal to or greater than the first diameter of its corresponding hole is at an outer edge of the peripheral region.

5. The composite material structure according to claim 1, wherein the slanted part is a first slanted part, and in a case where an orientation of the continuous fibers in the first slanted part is orthogonal to an orientation of continuous fibers to an adjacent second slanted part, the width of the composite material is defined as less than or equal to $1/\sqrt{2}$ a distance between centers of adjacent holes.

6. The composite material according to claim 1, wherein the first diameter is a major axis and the second diameter is a minor axis, forming an elongated hole in the 0° direction.

7. The composite material structure according to claim 1, wherein a first layer including a first area in which the composite material reinforced using continuous fibers made even in the longitudinal direction is repeatedly bent so as to define peak areas and valley areas in that order, and a second layer including a first area in which the composite material reinforced using continuous fibers made even in the longitudinal direction is repeatedly bent so as to define valley areas and peak areas in that order, are laminated together so that the peak areas in the first area of the first layer and the valley areas in the first area of the second layer define vertical pairs.

8. The composite material structure according to claim 1, wherein the holes are access holes defined in a lower surface outer plate of an aircraft wing.

9. The composite material structure according to claim 1, wherein the holes are window holes defined in an outer plate of an aircraft fuselage.

10. An aircraft wing comprising the composite material structure according to claim 8.

11. An aircraft fuselage comprising the composite material structure according to claim 9.

12. A method of manufacturing a composite material structure, the composite material structure comprising a fiber-reinforced plastic composite material extending in one direction, wherein the one direction is 0°, and having a plurality of holes defined at intervals in a row in the one direction, that is subjected to a tensile load or a compressive load in the one direction, the method comprising:

bending a composite material reinforced using continuous fibers made even in a longitudinal direction in a peripheral region around the holes so that a center line of a width of the composite material weaves between adjacent holes and zigzags in the one direction, thereby obtaining a first area,
wherein:
a tensile rigidity and/or compressive rigidity in the one direction of the peripheral region is lower than a tensile rigidity and/or compressive rigidity in the one direction of another region that surrounds the peripheral region;
the first area includes at least two parallel parts, wherein a first parallel part is positioned on a side and in contact with a hole of the plurality and is connected to a second parallel part on a side and in contact with an adjacent hole of the plurality by a slanted part disposed between the hole and adjacent hole, such that first parallel part on the side of the hole and the second parallel part on the side of the adjacent hole are on opposite sides; and
wherein the parallel part comprises the continuous fibers oriented in a 0° direction, is parallel to a first diameter of its corresponding hole, and includes an extension line of a second diameter of its corresponding hole oriented in a ±90° direction, wherein a portion of the parallel part has a length equal to or greater than the first diameter of its corresponding hole.

13. The method of manufacturing a composite material structure according to claim 12, wherein the slanted part comprises the continuous fibers oriented in a direction greater than or equal to ±30° and less than or equal to ±60°.

14. The method of manufacturing a composite material structure according to claim 13, wherein the slanted part comprises the continuous fibers oriented in a direction of ±45°.

15. The method of manufacturing a composite material structure according to claim 12, wherein the portion of the parallel part equal to or greater than the first diameter of its corresponding hole is at an outer edge of the peripheral region.

16. The method of manufacturing a composite material structure according to claim 12, wherein the first diameter is a major axis and the second diameter is a minor axis, forming an elongated hole in the 0° direction.

* * * * *